United States Patent [19]

Preus

[11] 3,998,060
[45] Dec. 21, 1976

[54] BARRIER FOR WATER CARRIED POLLUTANTS

[76] Inventor: Paul Preus, Smith Road, Toms River, N.J. 08753

[22] Filed: Apr. 14, 1976

[21] Appl. No.: 676,794

[52] U.S. Cl. .............................. 61/1 F; 210/DIG. 25
[51] Int. Cl.² .................. E02B 15/04; B63B 35/00
[58] Field of Search .......................... 61/1 F, 3–5; 210/242 S, DIG. 25

[56] References Cited

UNITED STATES PATENTS

| | | | |
|---|---|---|---|
| 2,228,529 | 1/1941 | Moeller | 210/DIG. 25 |
| 3,494,132 | 2/1970 | Logan | 61/1 F |
| 3,537,587 | 11/1970 | Kain | 61/1 F X |
| 3,592,007 | 7/1971 | Renner | 61/1 F |
| 3,664,136 | 5/1972 | Laval et al. | 61/1 F |
| 3,667,235 | 6/1972 | Preus et al. | 61/1 F |
| 3,703,811 | 11/1972 | Smith | 61/1 F |
| 3,922,861 | 12/1975 | Grihangne | 61/1 F |
| 3,922,862 | 12/1975 | Vidilles | 210/DIG. 25 |

*Primary Examiner*—Dennis L. Taylor
*Attorney, Agent, or Firm*—Harold L. Stowell

[57] ABSTRACT

A barrier for water carried pollutants comprises a series of end to end connectable boom sections containing a floatable material which may comprise an oleophilic-hydrophobic-lighter than water composition which will selectively absorb hydrocarbons; fluid impervious connectors for the ends of the boom sections and flexible draft members and associated connectors for maintaining the integrity of the boom if it becomes necessary to replace one or more of the boom sections.

6 Claims, 6 Drawing Figures

U.S. Patent    Dec. 21, 1976    Sheet 1 of 2    3,998,060
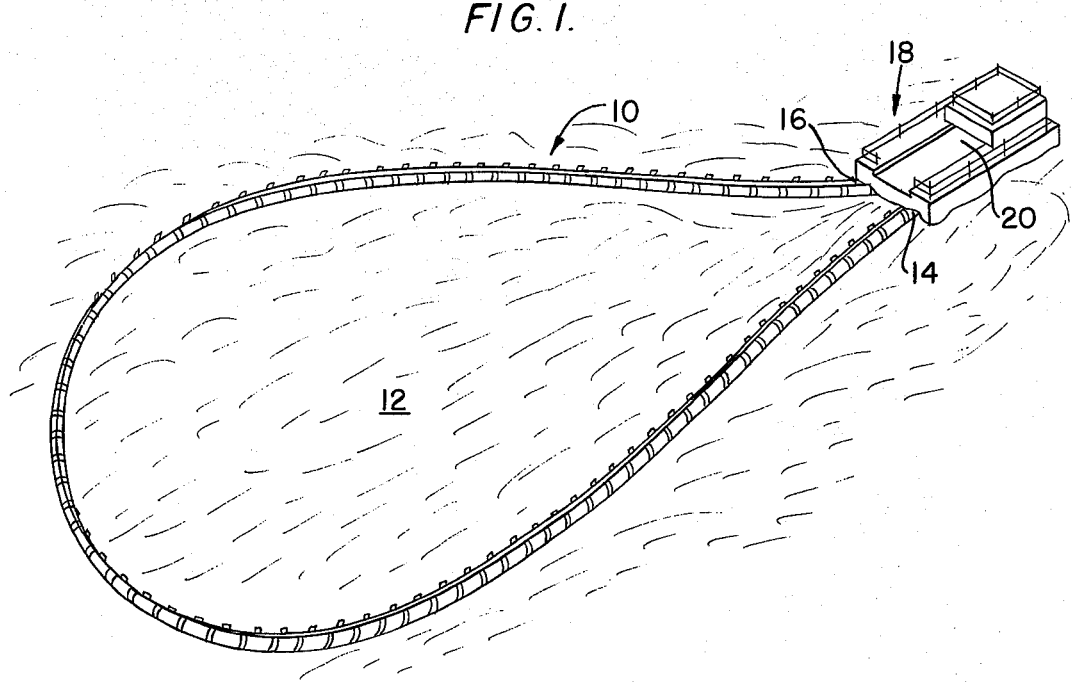
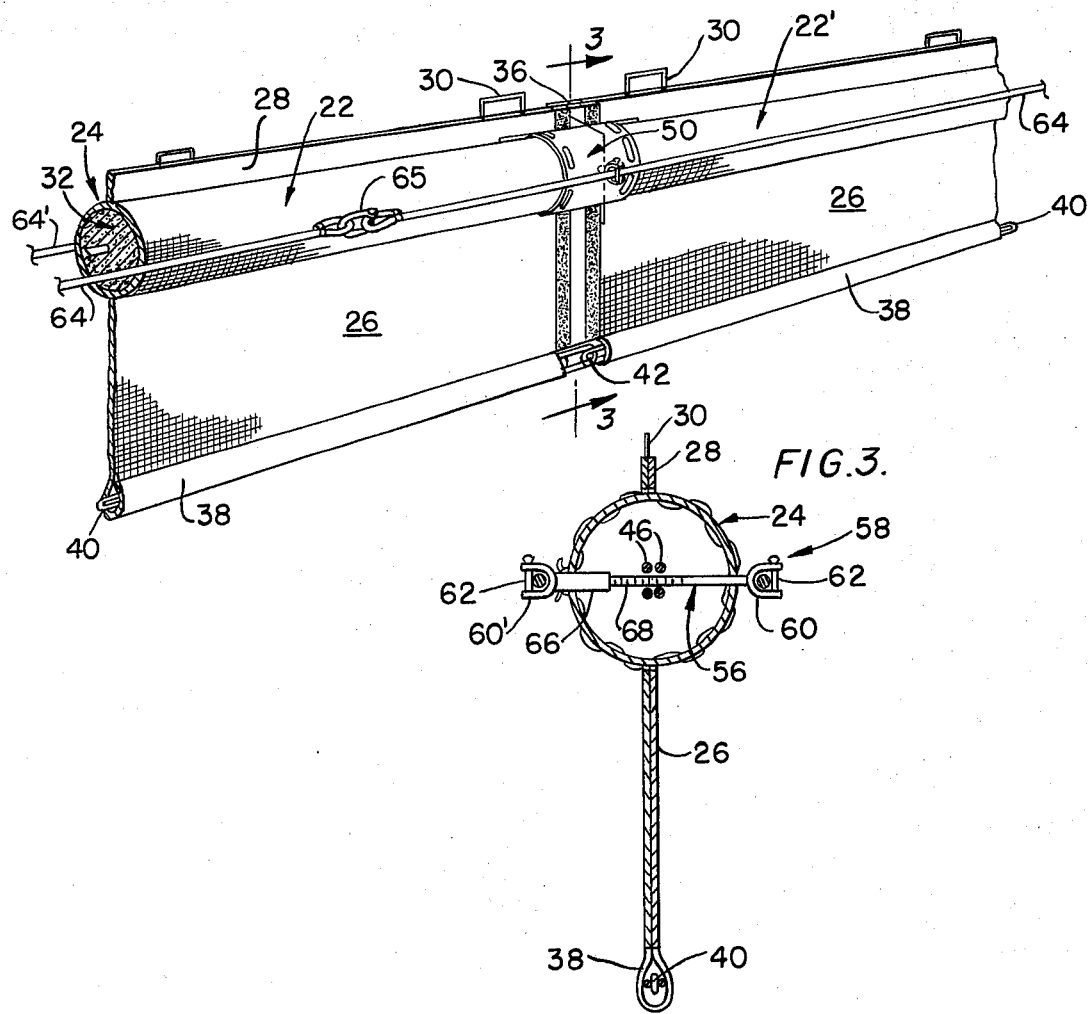

BARRIER FOR WATER CARRIED POLLUTANTS

CROSS-REFERENCE TO RELATED APPLICATIONS

Related subject material is disclosed in my U.S. patent application Ser. No. 497,712 filed Aug. 15, 1974 which is a continuation of application Ser. No. 292,886 now U.S. Pat. No. 3,855,152 which is a division of application Ser. No. 83,640 filed Oct. 24, 1970 now abandoned, and Ser. No. 676,795 filed even date herewith.

Further related subject matter is disclosed in my U.S. Pat. Nos. 3,849,989; 3,667,253; 3,783,621 and 3,667,225.

BACKGROUND OF THE INVENTION

FIELD OF THE INVENTION

Floating barriers, known generally as oil booms, have been found to have great utility in containing and controlling oil slicks and other water carried pollutants on and in bodies of water. The barriers usually include flotation elements having a depending liquid impervious skirt which, when deployed around or in a controlling position relative to the pollutant, provide means to contain or prevent the pollutant from spreading or moving into uncontaminated areas.

SUMMARY OF THE INVENTION

This invention is directed to a barrier for containing and controlling water carried pollutants, for example, oil wherein the entire barrier is composed of a series of boom sections which are connectable in end to end relationship with each of the boom sections containing a flotation material which, for example, comprises an oleophilic-hydrophobic-lighter than water compositions which will selectively absorb and/or adsorb hydrocarbons or other pollutants.

The boom sections are connected to flexible draft members such as cables or chains which maintain the integrity of the boom even if it becomes necessary to replace one or more of the boom sections or to enlarge the area confined by the boom or to decrease such area by removing boom sections. In addition to the flexible draft members and associated connectors for maintaining the integrity of the boom, the invention provides for fluid impervious connectors which engage opposed boom section ends and prevent the escape of the contained floating substance at each joint or connection between boom sections.

The invention will be more fully described in light of the accompanying drawing wherein like components throughout the figures are indicated by like numerals and wherein:

BRIEF DESCRIPTION OF THE DRAWING

FIG. 1 is a somewhat diagrammatic perspective view of an oil containing boom and a tender vessel constructed in accordance with the teachings of the present invention;

FIG. 2 is a perspective view of a pair of boom sections of the type wherein each of the floating booms includes a relatively long depending skirt;

FIG. 3 is a section on line 3—3 of FIG. 2;

DESCRIPTION OF PREFERRED EMBODIMENTS

Figure 4:
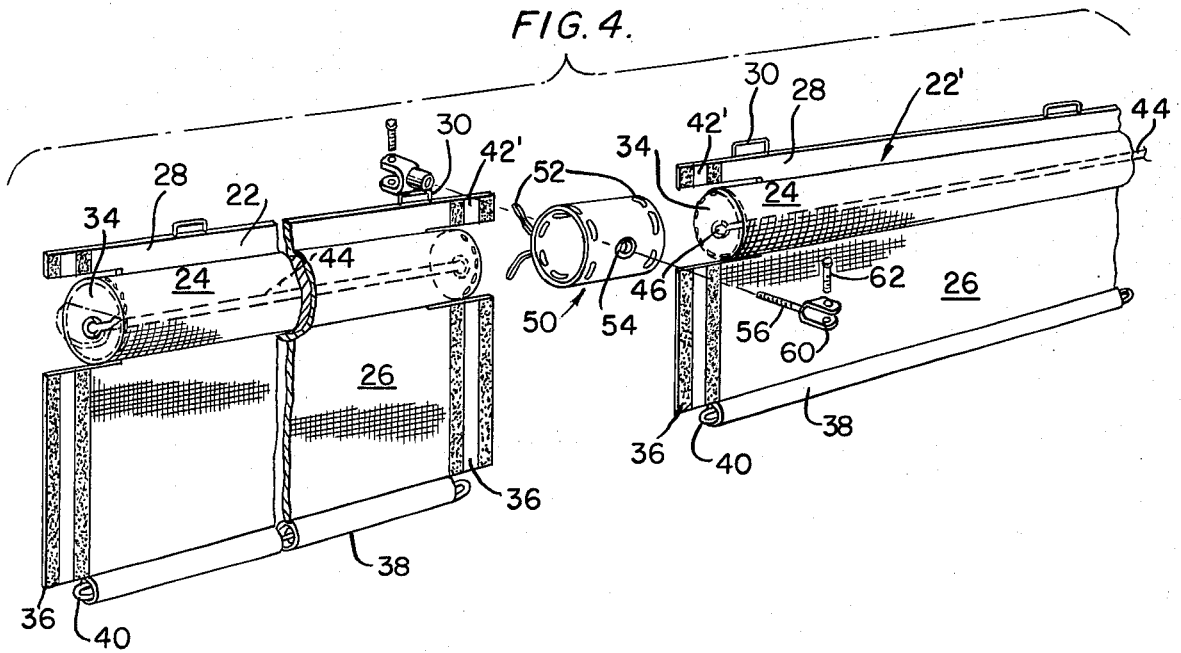
FIG. 4 is a view like FIG. 2 with the elements shown in a diassembled manner.

Referring to FIGS. 1 through 5, 10 generally designates a floating oil containing boom of the invention which boom surrounds an oil spill 12 floating on the surface of a body of water. In the illustrated form of the invention, the ends 14 and 16 of the boom are shown attached to a vessel 18 which may be of the type having a well 20 to receive oil picked up from the contained area. It will be appreciated, however, that the ends 14 and 16 of the boom 10 could be interconnected as are the other sections forming the boom and that the boom may be anchored all as to be more fully disclosed hereinafter.

The boom is made up of a plurality or series of boom sections, two of which are shown at 22 and 22' in FIGS. 2 and 4. Each of the boom sections comprises a generally tubular element 24 and a depending skirt 26. The tubular sections 24 may be provided with an upstanding fin 28 provided with hand grips 30 at spaced intervals there along.

The handles or hand grips 30 are useful in deploying and retrieving the boom sections. Further, the handles 30 are also very useful in storing the boom sections as the handles may be merely slipped over pegs spaced at least a pair of handles distance or multiples thereof. The hand grips have also been found to be helpful in cleaning the boom sections prior to reuse as the handles may be hung over hooks movably positioned above a scrub tank.

The upstanding fin 28 is useful in reducing slopover of the hydrocarbons being contained within the boom by wind, currents and wave action.

Within the tubular portions 24 is maintained a suitable flotatable material 32 which in a preferred embodiment of this invention comprises "Sorbent C", an oleophilic-hydrophobic-lighter than water composition which will selectively absorb hydrocarbons floating on water. Such oleophilic-hydrophobic-lighter than water composition may comprise expanded pearlite 60–80% by weight; cellulose fibers 13–33% by weight; clays 4–8% by weight; and asphalt 1–5% by weight, all as more fully described in my U.S. Pat. No. 3,855,152 and my copending application Ser. No. 597,712 filed Aug. 15, 1974.

While "Sorbent C" is a preferred composition for filling the tubular portions 24 other suitable absorbents and/or adsorbents may be used without departing from the scope of the present invention.

When the cylindrical or tubular portion of the boom sections 22 contain such selective oil absorbing and/or adsorbing material, the tube 24 is constructed of liquid pervious material such as mesh, which mesh may be formed of organic and/or inorganic fibers, plastic, metal or combinations thereof and at least one of the ends of each of the boom segments is provided with a cylindrical end cover 34 which may be laced to the tubular portion as shown or attached by Velcro type fasteners or combinations thereof. Where each of the tubular portions of the boom is filled with a non-oil or hydrocarbon absorbent material such as foam plastic, cork or the like, then the material of construction of such tubular portions may be previous or impervious, and a nylon reinforced, oil resistant fabric has been found to be very satisfactory.

Where desired, each of the boom segments 22, 22', etc. may include a depending skirt 26, which depending skirt is formed of a fluid impervious material such as sheet plastic or plastic or rubber coated fabrics which should be relatively inert to the solvent or softening action of hydrocarbons. Further, the skirt 26, where employed, may comprise plural skirts as shown, for example, in my U.S. Pat. Nos. 3,849,989 or 3,667,235.

Where the skirt is employed, its length is greater than the length of the tubular portion 24 to provide overlapping portions 36 which may be fastened together by suitable separable fasteners, lacings or the like. Further, where such skirt is employed, the lower portion of the skirt is provided with a roll 38 containing a ballast chain or the like 40. The ends of the ballast chain 40, of opposed sections, are connected together by a through bolt generally designated 42 in FIG. 2 of the drawing.

Also as illustrated in FIGS. 2 and 4, an upstanding fin 28 is provided for the boom, its length in a longitudinal direction is equivalent to the longitudinal length of the depending skirt to also provide overlap fastening ends 42' in a like manner to the overlap ends 36 of the skirt 26.

Extendings through each of the boom sections 22 and 22', etc., is an interior wire, chain or cable 44 having eyes 46 at each end. The cable and eye may pass through the center of each of the boom sections 22 and 22' or above or below the center line.

The assembly also includes a fluid impervious draw tight cap generally designated 50 for each pair of boom sections. The draw tight cap 50 is provided with a draw string 52 at each end and intermediate the ends of the draw tight cap are grommets through which pass the shank 56 of connectors generally designated 58. The ends of the strings 52 may, if desired, be tied to adjacent handles 30 which would aid in preventing longitudinal movement of the cap 50. The grommets 54 preferably made of a resilient material to provide an impervious seal between the shank 56 of connectors 58 to prevent hydrocarbon leakage at the joints.

Each end of the connectors 58 is provided with a clevis 60 and 60' having a closure or connector bolt 62 between the furcations thereof. Each of the clevis connectors 60 and 60' receives between the furcations thereof a wire, chain or other flexible draft member 64 for clevis 60 and 64' for clevis 60' as more clearly shown in, for example, FIGS. 2, 3 and 5. The flexible draft members 64 and 64' extend the entire length of the boom and these members maintain the integrity of the boom even when one or more of the boom sections 22 and 22' is removed for replacement, enlargement or shortening of the entire boom 10 as to be more fully described hereinafter. However, it will be noted that these cables, while being continuous, are made up of a plurality of lengths which are connected together as at 65 in FIG. 2.

It will be noted from FIG. 3 that each connector 58 comprises an internally threaded female half 66 and an externally threaded male half 68.

Figure 5:
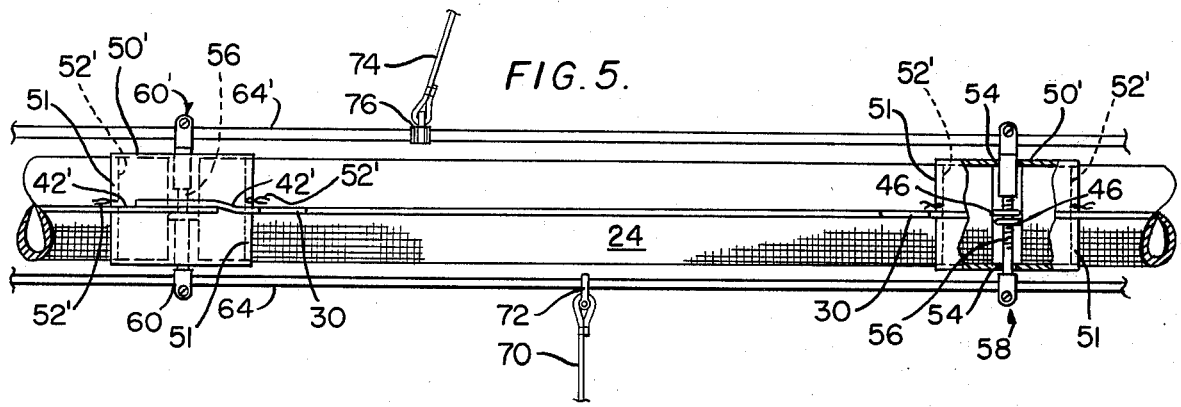
FIG. 5 is a top plan view of structures like those shown in FIGS. 2 and 3 having a modified form of the tight cap.

In FIG. 5 a modified form of fluid impervious draw tight cap generally designated 50' for each pair of boom sections is shown. The draw tight cap 50' is provided with a draw string 52' at each end, which strings 52' are received in pockets 51 about each end of each cap and are brought out of openings 53 and then tied to adjacent handles 30 as in the previous form of the invention. Intermediate the ends of the draw tight cap are grommets 54 through which pass the shank 56 of connectors generally designated 58. The grommets 54 are preferably made of a resilient material to provide an impervious seal between the shank 56 of the connectors.

It will also be noted in FIG. 5 that means are shown for attaching anchor lines to the cables 64 and 64' where anchors are desired. In one form, anchor line or cable 70 is shown connected to cable 64 via a clevis type connector 72, similar to connectors 60. Using this type of connector, limited sliding motion is permitted between the connector 72 and the cable 64. Illustrated in respect to anchor line 74 is a form of connector 76 comprising a cable clamp so that no sliding motion exists between the cable 64' and the anchor line 74.

In operation of this form of the invention, a pair of flexible draft members 64 and 64' are deployed about the area to be confined by the boom and a first pair 22 and 22' of the boom sections are placed in the water between the pair of cables or the like 64 and 64'. The pair of boom sections are brought together and, where skirts and webs 26 and 28 are employed, the skirts are suitably connected as is the ballast chain 40 by through bolt 42. Then the draw tight cap 50 is placed over each end of the pair of boom sections which have been brought together. A connector 58 with the internally threaded end 66 separated from the externally threaded end 68 is passed through the grommets 58, through each of the eyes 46 at the ends of cables 44 then the separated elements are reunited as shown in FIG. 3 of the drawing. With the connector halves 54 reunited and holding the pair of boom sections together, the bolts 62 are removed from the clevis ends 60 and 60' and the respective cables 64 and 64' are placed between the furcations thereof and the through bolts 62 are replaced. After this assembly, each of the drawing strings 52 or 52', as the case may be, is securely tightened about its respective end of the booms and tied. This procedure is continued until the entire boom, as shown in FIG. 1, is assembled.

In the event it becomes necessary to replace one or more boom sections or enlarge or decrease the size of the boom, all that is required is to loosen the ties 52 or 52' of the tie tight cap 50 or 50', remove each of the through bolts 62 from the clevis ends of the connector 58; slip the wires from the furcations thereof and unscrew the externally threaded portion 68 from the internally threaded portion 66 of the connector whereby the connector can be withdrawn from the pair of eyes 46 and from the grommets in the draw tight cap 50 or 50'. It will be appreciated that, since no break has been made in cables or the like 64 and 64', the basic integrity of the boom is maintained while the above procedure is followed and a boom segment is replaced or, where the boom is to be shortened, the next adjacent boom section are brought into abutting relationship.

Any suitable form of cables 64 and 64' or chains can be used in the unit; however, in order to insure the integrity of the boom even in rivers which may contain floating debris such as trees, logs, etc., tensile strengths in the order of from about 4,000 to 80,000 pounds is desirable in the cables.

Figure 6:
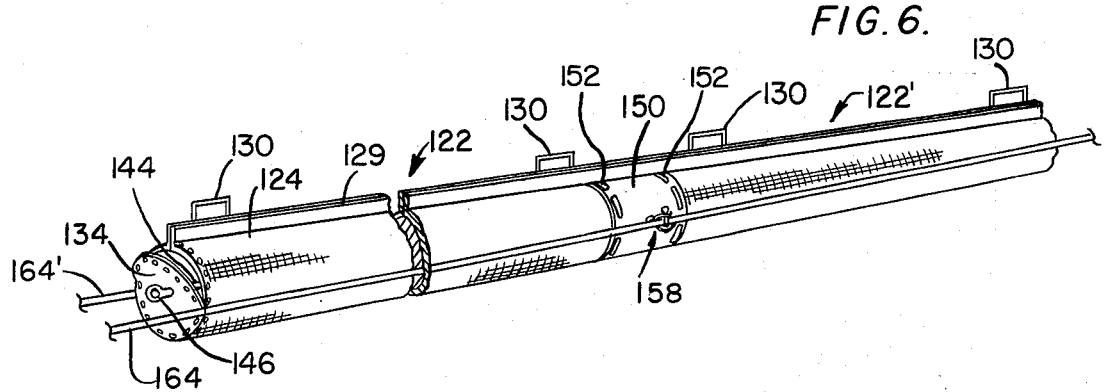
FIG. 6 is a view like FIG. 2 of a modified form of the present invention.

Referring now to FIG. 6 of the drawing, a modified form of the present invention is shown wherein each boom section 122, 122', etc. comprises a tubular sleeve 124 having generally circular end closure means 134. Each boom section 122, 122', etc. has a fin 129 and suitable handles 130. The fins 129 may be formed when forming the cylindrical body portion from a flat piece of mesh fabric or the like. In FIG. 6, the boom 122 is shown with one of the end closures 134 partly open for filling with a floatation material which preferably has selective oil absorptive or adsorptive properties as hereinbefore described with reference to the form of the invention shown in FIGS. 2 through 5. Once the cylindrical boom is filled with the flotation material, the open end flap 134 is closed such as by lacing.

Extending through each of the boom sections is a cable, chain or interior wire 144 having eyes 146 at its ends, which eyes as in the previously described form of the invention receive the shank 156 of the connectors 158 which in turn releasably receive the pair of cables 164 and 164'. As in the previous form of the invention, the connectors 158 pass through grommets 154 in a draw tight cap 150 provided with a pair of draw strings 152, one for each end of adjacent booms 122 and 122'. Thus, as in the previously described form of the invention, the boom assembly can be enlarged or decreased in size or one or more of the boom sections can be replaced without loosing the integrity of the assembly.

It has been found that the boom sections 22, 22', 122 and 122', having a length of about 5 feet and a diameter of about 8 inches, provides very satisfactory results. However, the length of each section may be from 2 feet to 100 feet and the diameter of each tubular section may be from 3 inches to as much as 36 inches. When the boom sections include depending skirts such as skirts 26, a skirt length of about 30 inches is satisfactory for open water containment and prevents underflow of oil in low and moderate water currents and skirt lengths of from 6 inches to more than 36 inches have been found to be useful.

Throughout the specification and in the drawings, the invention has been described as being deployed with a substantial freeboard; however, it will be recognized that in some cases the barrier may be anchored such that the top of the barrier is below the surface of the water, with, for example, the lower edge of the skirt on or adjacent to the bottom of the water body. Further, two or more barrier units may be assembled in stacked superposed relation.

One of the additional advantages of the present form of construction is that, if the skirt and/or tubular sleeve become worn or torn, the hardwear such as the cables 44, 64, 64', etc.; the connectors 56, etc. and chain 40, etc. may be reused with a new fabric sleeve and skirt.

Further, it will be appreciated by those skilled in the art that the absorbent or adsorbent material within each boom section may be readily replaced after the utility of the initial charge has been exhausted.

In the illustrated form of the invention, the boom 10 is shown connected to a harvesting boat 18, however, the boom may be used to encircle the pollutant then the unit, with the enclosed pollutant, may be floated or towed to a suitable location for removal of the encircled pollutant.

Further, plural segments of booms may be connected employing the clevis connectors 60 and 60' to form "T" or "X" intersections of boom at any section joint. This can be invaluable for accomplishing subdivision of boomed-off areas or for doubling critical areas of containment.

What has been set forth above is intended as exemplary of the present invention to enable those skilled in the art to practice the invention and what is new and therefore desired to be protected by Letters Patent of the United States is:

I claim:

1. A barrier for water carried pollutants comprising a series of end to end connectable boom sections, each of said boom sections comprising a hollow tubular sleeve comprising the flotation means, a cable extending through each said sleeve and having an eye at each end externally of the ends of the sleeve, a separable connector passing through the eyes of adjacent boom sections, each said connector having a length greater than the cross dimensions of the boom sections, means at the ends of said connectors to releasably receive flexible draft means extending along each side of the barrier and fluid impervious cap means releasably secured to each end of a pair of adjacent boom sections.

2. The invention defined in claim 1 wherein said flotation means comprises a comminuted oleophilic-hydrophobic-lighter than water composition to selectively absorb hydrocarbons.

3. The invention defined in claim 2 wherein the means for releasably securing the fluid impervious cap means to each end of the pair of adjacent boom sections comprises draw strings.

4. The invention defined in claim 3 wherein the fluid impervious cap means is provided with a pair of grommets in the sidewall thereof through which the separable connector passes.

5. The invention defined in claim 1 wherein said means at the ends of said connectors releasably receiving cable means extending along each side of the barrier comprise bifurcated shackles.

6. A barrier for oil and the like hydrocarbon floating on water comprising a series of end to end connectable boom sections, each said boom section comprising a hollow pervious tubular sleeve, a flotable oleophilic-hydrophobic-lighter than water composition in each said tubular sleeve, a cable extending through each said sleeve and having an eye at each end externally of the ends of the sleeve, a separable connector passing through the eyes of adjacent boom sections, each said connector having a length greater than the cross dimensions of the boom sections, means at the ends of said connectors releasably receiving cable means extending along each side of the barrier and fluid impervious cap means releasably secured to each end of a pair of adjacent boom sections.

* * * * *